(12) United States Patent
Liu et al.

(10) Patent No.: US 7,576,837 B2
(45) Date of Patent: Aug. 18, 2009

(54) MICRO-MIRROR OPTICAL TRACKING AND RANGING SYSTEM

(75) Inventors: Jony Jiang Liu, Olney, MD (US); Christian von der Lippe, Columbia, MD (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 0 days.

(21) Appl. No.: 11/845,214

(22) Filed: Aug. 27, 2007

(65) Prior Publication Data
US 2008/0174762 A1 Jul. 24, 2008

Related U.S. Application Data

(60) Provisional application No. 60/840,790, filed on Aug. 29, 2006.

(51) Int. Cl.
*G01C 3/08* (2006.01)
(52) U.S. Cl. .................................... 356/5.15
(58) Field of Classification Search ....... 356/3.01–3.15, 356/4.01–4.1, 5.01–5.15, 6–22
See application file for complete search history.

(56) References Cited

U.S. PATENT DOCUMENTS

| | | | |
|---|---|---|---|
| 4,231,534 A | 11/1980 | Lintell et al. | |
| 4,721,385 A * | 1/1988 | Jelalian et al. | ............. 356/5.09 |
| 6,618,178 B2 | 9/2003 | Engelhardt | |
| 6,646,773 B2 | 11/2003 | Garner | |
| 6,681,063 B1 | 1/2004 | Kane et al. | |
| 7,164,702 B1 | 1/2007 | Liu et al. | |
| 2003/0043363 A1* | 3/2003 | Jamieson et al. | ............. 356/5.01 |
| 2006/0290917 A1* | 12/2006 | Soreide et al. | ............. 356/5.11 |

OTHER PUBLICATIONS

Jony J. Liu, Advanced High-Bandwidth Optical Fuzing Technology, Oct. 24, 2005, Proc. of SPIE vol. 6017 60170F-1, Published on-line.

* cited by examiner

*Primary Examiner*—Thomas H Tarcza
*Assistant Examiner*—Luke D Ratcliffe
(74) *Attorney, Agent, or Firm*—Guy M. Miller; Lawrence E. Anderson

(57) ABSTRACT

A micro-mirror optical tracking and ranging system comprises an optical transceiver having a Micro-Electro-Optical Mechanical System (MEOMS) micro-mirror beam steering system and an electronic control and operating system for processing electronic signals. An optical transceiver and MEOMS micro-mirror beam steering system comprises two oppositely installed micro-mirrors controlled so that they spin and tilt synchronously and project a laser beam out in a wide solid angle and interval in a substantially conically shaped scanning pattern. Such an optical transmitter system provides a steered frequency-modulated continuous-wave (FMCW) laser beam. When a laser beam waveform reflects off of an object within the scanned patter it is detected by the optical receiver an electronic control and operating system processes the detected laser beam waveform by mixing it with the original transmitted laser beam waveform and calculates the precise distance and location of the object.

12 Claims, 4 Drawing Sheets ing system with an extremely high spatial resolution. Another object of
MICRO-MIRROR OPTICAL TRACKING AND RANGING SYSTEM

CROSS-REFERENCE TO RELATED APPLICATIONS

This application claims priority of U.S. Provisional Patent Application No. 60/840,790 filed on Aug. 29, 2006, entitled "Micro-Mirror Optical Tracking and Ranging System."

STATEMENT REGARDING FEDERALLY SPONSORED RESEARCH or DEVELOPMENT

The invention described herein may be manufactured and used by or on behalf of the Government of the United States of America for government purposes without the payment of any royalties thereon or therefore.

BACKGROUND OF THE INVENTION

This invention relates generally to optically sensing and tracking systems, and more particularly to an optical sensing and tracking system using a laser, micro-mirrors, microelectronics, optoelectronics and photonics technologies for detecting objects with precise range and directional resolution.

An optically controlled laser transmitter and photodetector system using surface-emitting lasers and micro-optical elements, as can be used in the present invention, is described in U.S. Pat. No. 7,164,704 to Liu et al. and is incorporated herein by reference.

The use and control of micro-mirrors for display and projection has been fully demonstrated. U.S. Pat. No. 6,681,063 entitled "Low Voltage Micro-Mirror Array Light Beam Switch" to Kane et al. describes a micro-mirror light beam switch with packaged CMOS driving circuitry. U.S. Pat. No. 6,646,773 entitled "Digital Micro-Mirror Holographic Projection" to Garner describes the use of micro-mirrors in a method and apparatus for display of three-dimensional images. U.S. Pat. No. 6,618,178 entitled "Optical Arrangement For Deflecting A Light Beam, Particularly In Two Substantially Mutually Perpendicular Directions and Confocal Scanning Microscope" to Engelhardt describes micro-mirrors for a scanning microscope application. However, all of these references pertain to display and/or projection and not detection and tracking of objects within a particular field of view.

BRIEF SUMMARY OF THE INVENTION

The invention disclosed herein incorporates state-of-the-art microelectronics, optoelectronics, and photonics technologies. One object of the invention is to detect, track, and determine object range or distance in a wide full solid-angle with an extremely high spatial resolution. Another object of the invention is to track and pin-point the range of a specific object in a very specific direction. Yet a further object of the present invention is to provide a tracking and ranging system that is physically compact, light and inexpensive to manufacture. The present invention can replace conventional radar tracking systems which lack directional precision, especially through rough terrain.

The aforementioned features, objects, and advantages of this method over the prior art will become apparent to those skilled in the art from the following detailed description and accompanying drawings.

BRIEF DESCRIPTION OF THE SEVERAL VIEWS OF THE DRAWINGS

Our invention can best be understood when reading the following specification with reference to the accompanying drawings, which are incorporated in and form a part of the specification, illustrate preferred embodiments of the present invention, and together with the description, serve to explain the principles of the invention. In the drawings.

DETAILED DESCRIPTION OF THE INVENTION

Figure 1:
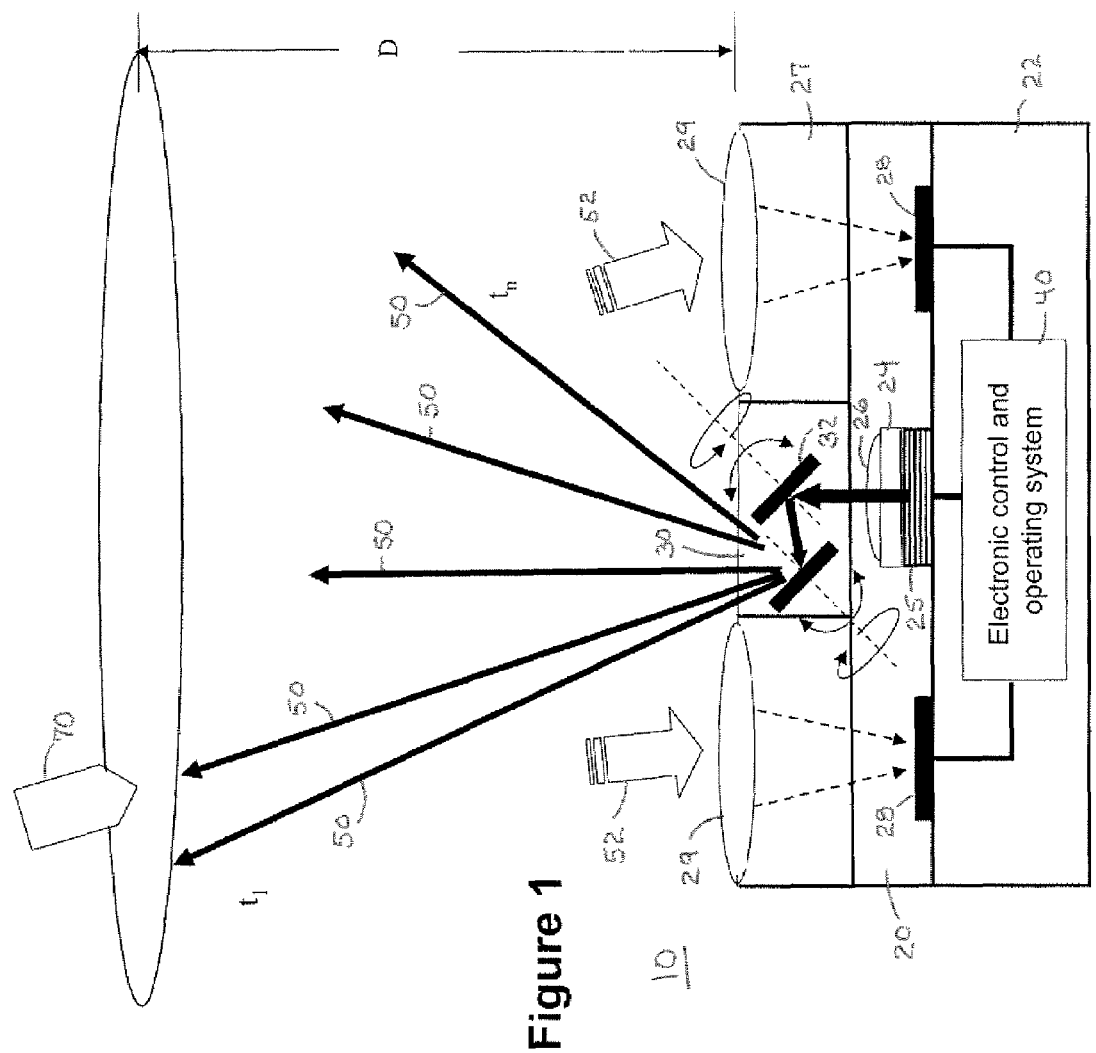
FIG. 1 is a cross-sectional side view diagram showing one embodiment of the micro-mirror optical tracking and ranging system in operation showing transmitted and reflected laser beams.

Referring now to FIG. 1, a micro-mirror optical tracking and ranging system 10 comprises an optical transceiver 20 having a Micro-Electro-Optical Mechanical System (MEOMS) micro-mirror beam steering system 30 and an electronic control and operating system 40 for processing electronic signals. The optical transceiver 20 comprises a device submount 22, a pseudo-monolithic optical laser transmitter 24 having a micro-semiconductor laser 25 and laser beam shaping and control 26, and optical photoreceiver 27 having photodetector 28 and detector focusing optic 29. The photodectors 28 can be metal-semiconductor-metal photodetectors. The MEOMS micro-mirror beam steering system 30 comprises two oppositely installed micro-mirrors 32 controlled by the electronic control and operating system 40 so that they spin and tilt synchronously and project the laser beam out in a wide solid angle. The micro-mirrors 32 are very small in mass and mounted perpendicular to the post (not shown) on which they are attached. The post is electro-magnetically driven to spin at a very high speed and with different tiltings. When two micro-mirrors 32 operate (spin and tilt) synchronously in opposite direction, they can reflect and project out an incident laser beam 50 into a wide solid angle and interval in a substantially conically shaped scanning pattern.

Figure 2:
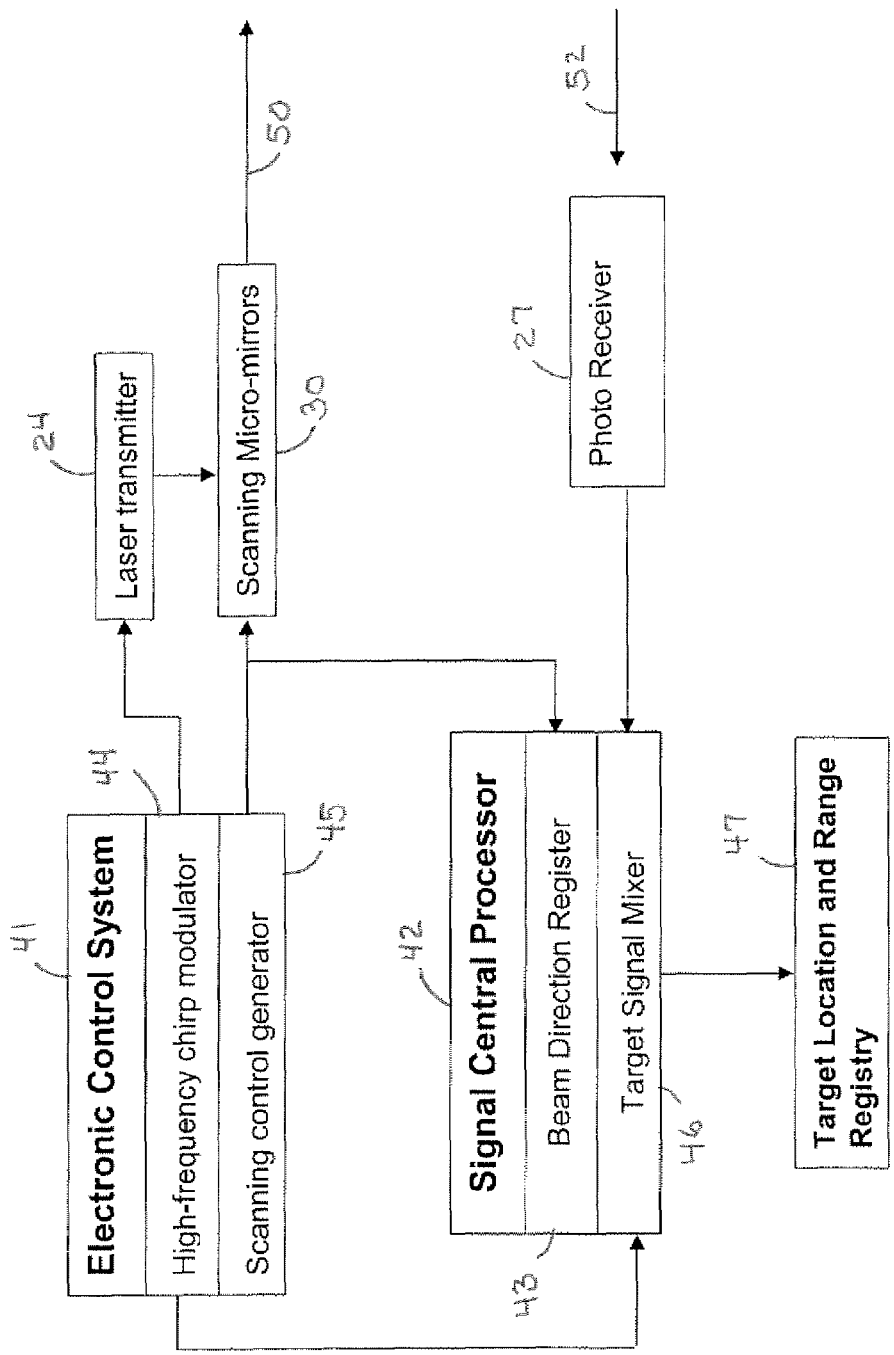
FIG. 2 shows a functional block diagram of a system utilizing the invention.

As shown in FIG. 2, the electronic control and operating system 40 comprises an electronic control system 41 and signal central processor 42. A scanning control generator 45 controls the movement of the micro-mirrors 32 within the micro-mirror beam steering system 30. A beam direction register 43 registers the rotation and tilting position of the micro-mirrors 32 of the micro-mirror beam steering system 30 at any instant moment for identifying the specific direction of the projected beam 50. In other words, the beam direction register 43 registers the position of the micro-mirrors 32 at predetermined intervals which correlate to a specific direction of the steered modulated laser beam that is used for determining the location of the scanned object 70 in relation to the optical tracking and ranging device. Such an optical transmitter system provides a steered frequency-modulated continuous-wave (FMCW) laser beam 50 across a predetermined scanning angle and interval in a substantially conically shaped scanning pattern represented in FIG. 1 by laser beam 50 at different points in time $t_1$ to $t_n$. The electronic control system 41 has a high-frequency chirp modulator 44 that synchronously modulates the micro-semiconductor laser transmitter 24 and the photoreceiver 27 with the same frequency and controls the movement of the micro-mirrors 32 of the MEOMS micro-mirror beam steering system 30. When a laser beam waveform 52, reflected off of object 70, is detected by the optical photoreceiver 27 a target signal mixer 46 within the signal central processor 42 processes the detected laser beam waveform by mixing it with the original transmitted laser beam waveform and calculates the precise range D and location of the object 70. Target location and range are stored in a target location and range registry 47.

Figure 3:
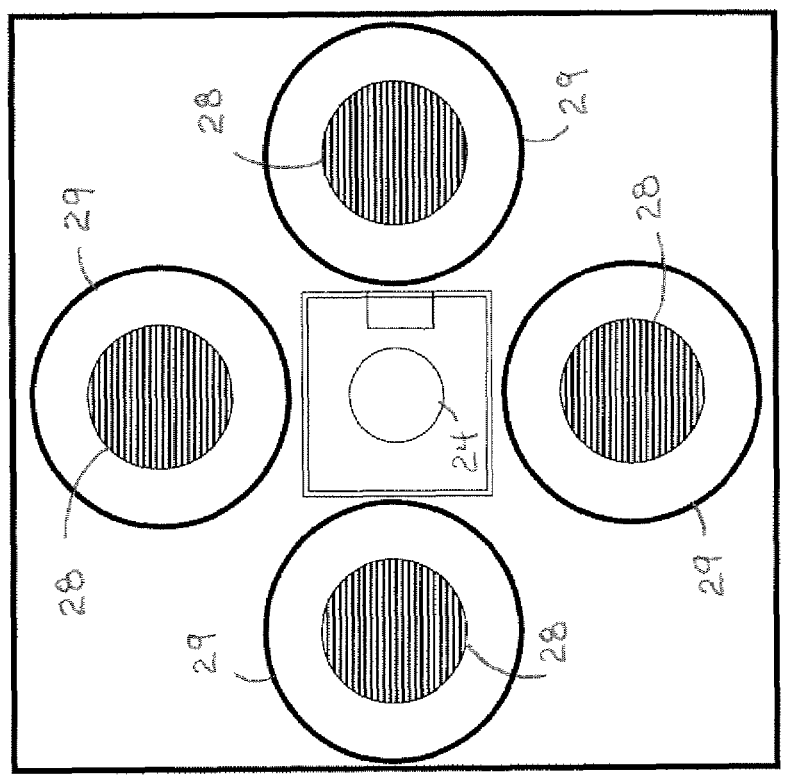
FIG. 3 is a top view schematic diagram showing a micro-mirror optical tracking and ranging transceiver constructed in accordance with the invention.

FIG. 3 shows a top view diagram showing one embodiment of a Micro-Mirror Optical Tracking and Ranging transceiver 10. A plurality of photodetectors 28 and detector focusing optics 29 are shown symmetrically disposed around the pseudo-monolithical optical transmitter 24.

According to one aspect of the invention the optical laser transmitter 24 transmits a highly collimated laser beam that is amplitude modulated with a triangular chirped RF signal at frequency $f_{RF}$. High-power vertical-cavity surface emitting lasers (VCSELs) and high bandwidth SiGe driver may be used as the optical transmitter. An optically controlled laser transmitter and photodetector system using surface-emitting lasers and micro-optical elements, as can be used in the present invention, is described in U.S. Pat. No. 7,164,704 to Liu et al. and is incorporated herein by reference.

The micro-mirror beam steering system 30 steers the modulated laser beam 50 across a predetermined scanning angle and interval in a substantially conically shaped scan pattern at such a rate that at each scanning point any reflected signal should be detected without interference from other reflected signals at different locations within the conically shaped scan pattern. The following are some parameters in reference to such a mechanism:

Scanning coverage angle—160°×160°
   Scanning resolution—0.5 o
   Scanning points—51,200
   Scanning frequency—512 KHz=10 times across the full solid angle space per second
   Time taken at each scanning point—2 ms Time for roundtrip travel of the laser signal to:
   100 meters—6.67 ms
   200 meters—1.33 ms
   300 meters—2.00 ms
   400 meters—2.65 ms
   500 meters—3.33 ms These numbers indicate that under a specific scanning frequency any object within a certain distance will be detected before the laser beam moves to the next scanning spot. For example, when the system is scanning at a frequency of 512 KHz, the signal from objects within 300 meters will be detected without any confusion.

Photodetectors 28 have their electrical bias modulated at the same time-dependent operational frequency as the transmitted laser beam signal 50. As the photoreceiver 27 detects the reflected optical signal 52 from an object 70, the target signal mixer 46 within the signal central processor 42 heterodynes (mixes) it with a portion of the delayed transmitted waveform 52. The generated intermediate frequency $f_{IF}$ (or beat frequency) corresponds to the time delay due to the travel of the light. Measurement of the $f_{IF}$ yields directly the range information of the target or object from the optical tracking and ranging device 10.

Figure 4:
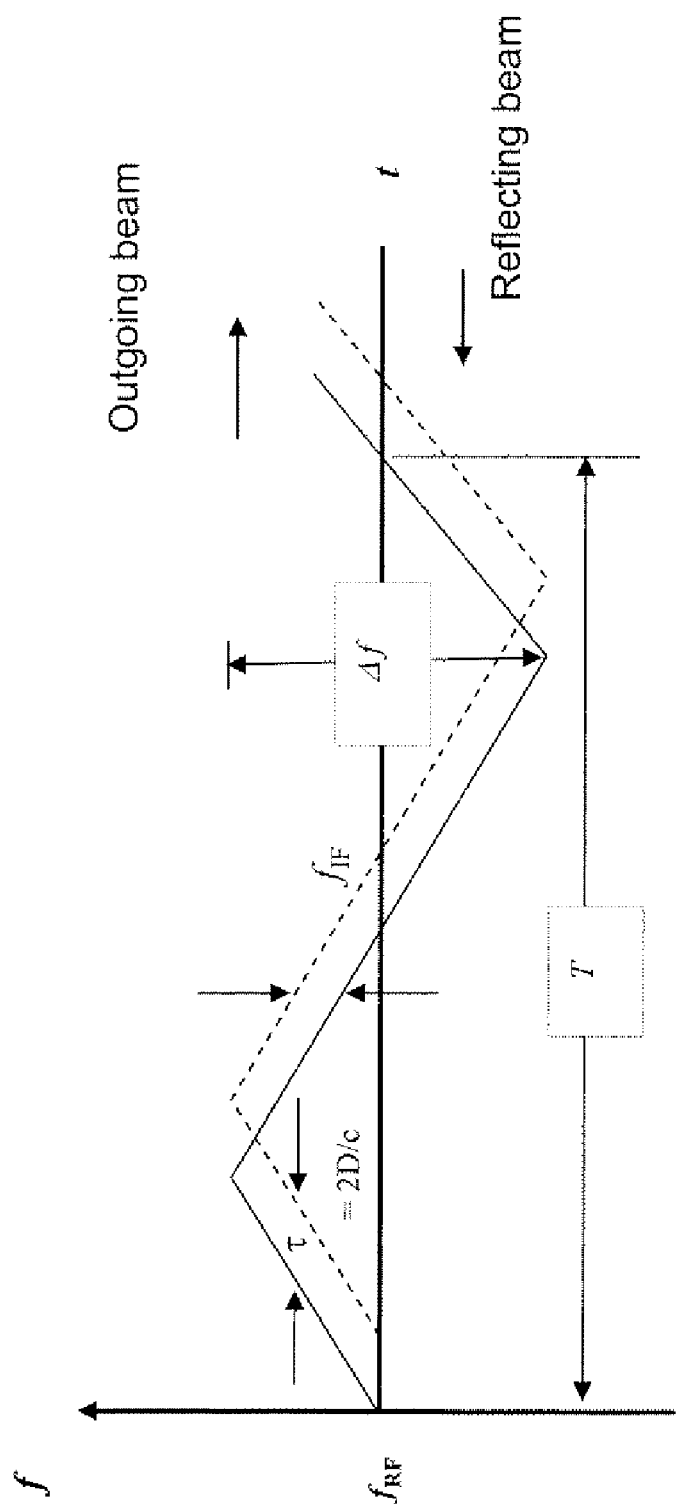
FIG. 4 is an illustration of the transmitted and reflected waveforms in the operation of the Micro-Mirror Optical Tracking and Ranging system.

FIG. 4 is an illustration of transmitted and reflected waveforms in the operation of the Micro-Mirror Optical Tracking and Ranging transceiver. The transmitted or outgoing laser beam is operated at $f_{RF}$ (transmission frequency) with a triangular chirping modulation of f over a time period of T and is represented as the solid line. The reflected laser beam with a time delay is represented as a dashed line. The time delay between the transmitted and reflected waveforms from the target or object will be =2(D/c), where D is the distance from the sensor to the scanned object or target and c is the speed of light. The range or distance D of the target is determined using the following relationships with calculated $f_{IF}$.

$$f_{IF} = \left(\frac{2D}{c}\right)\left(2\frac{\Delta f}{T}\right) = \frac{4D(\Delta f)}{cT}$$

$$D = \frac{cT}{4\Delta f} f_{IF}$$

Although various preferred embodiments of the present invention have been described herein in detail to provide for complete and clear disclosure, it will be appreciated by those skilled in the art that variations may be made thereto without departing from the spirit of the invention or the scope of the appended claims.

We claim:

1. An optical tracking and ranging device comprising:
   a pseudo-monolithic optical transmitter for outputting a substantially collimated laser beam at a predetermined frequency and modulation;
   a micro-electro-optical mechanical system (MEOMS) laser beam steering device disposed to receive the substantially collimated laser beam from said pseudo-monolithic optical transmitter for steering the modulated laser beam; the MEOMS laser steering device comprising a plurality of planar micro-mirrors each of which is mounted perpendicular to a central axis upon which the mirrors rotates, the MEOMS laser steering device being controlled by electronic control so that they spin and tilt to form an adjustable conical shaped scanning pattern;
   at least one optical receiver modulated synchronously with the collimated laser beam at the predetermined modulation frequency for detecting a modulated laser beam reflected off of a scanned object present within the conically shaped scan pattern;
   a high-frequency chirp modulator operatively connected to the pseudo-monolithic optical transmitter and at least one receiver; the high-frequency chirp modulator generating at least one output signal that synchronously modulates the pseudo monolithic optical transmitter and the at least one optical receiver;
   a signal processor comprising a beam direction element and a target signal mixer, the beam direction element being operatively connected to the plurality of planar micro-mirrors and operating to register the rotation of the micro-mirrors at each instant in time for recording the specific direction of the transmitted laser beam; the target signal mixer operatively connected to the at least one optical receiver and the high frequency chirp modulator; the target signal mixer comprising an operating system for mixing the detected laser beam reflected off of the scanned object with the at least one output signal of the high frequency chirp modulator for generating an intermediate frequency that is used for determining the distance of the scanned object from the optical tracking and ranging device; and a target location and range element operatively connected to the signal central processor for storing the target location and range information to thereby track the target;

whereby the device detects an object using a wide-angle, substantially conically shaped scanning pattern, or tracks the object in a very specific direction using a particular field of view.

2. The optical tracking and ranging device of claim 1 wherein the operating system registers the position of the electro-optical mechanical mirror laser beam steering device at predetermined intervals which correlate to a specific direction of the steered modulated laser beam whereby the registered positions are used for determining the location of the scanned object in relation to the optical tracking and ranging device.

3. The optical tracking and ranging device of claim 1, wherein the optical receiver comprises:
   at least one photodetector; and
   at least one detector focusing optic for focusing the modulated laser beams reflected off of the scanned object onto the at least one photodetector.

4. The optical tracking and ranging device of claim 1 wherein the pseudo-monolithic optical transmitter outputs a substantially collimated laser beam at a predetermined frequency and triangular chirp modulation.

5. An optical proximity sensor system for detection of objects comprising:
   an enclosure;
   a micro semiconductor laser transmitter mounted within the enclosure for transmitting light signals; the transmitted light signals being modulated in a first frequency range;
   a micro-electro-optical mechanical system (MEOMS) laser beam steering device disposed to receive the transmitted light signals and for steering the transmitted light signals across a predetermined scanning angle and interval in a conical scan pattern; the MEOMS laser steering device comprising a plurality of planar micro-mirrors each of which is mounted perpendicular to a central axis upon which the mirrors rotates, the MEOMS laser steering device being controlled by electronic control so that the mirrors rotate and tilt to form a conical shaped scanning pattern;
   at least one photo receiver operating at the first frequency range mounted on the enclosure for receiving returned light signals reflected from an object in proximity to the enclosure;
   a high-frequency chirp modulator operatively connected to the micro semiconductor laser transmitter and at least one receiver; the high-frequency chirp modulator generating at least one output signal in said first frequency range that synchronously modulates the micro semiconductor laser transmitter and the at least one optical receiver;
   a signal processor mounted within the enclosure comprising a beam direction element and a target signal mixer, the beam direction element being operatively connected to the plurality of planar micro-mirrors and operating to register the rotation and tilt of the micro-mirrors at each instant in time in order to record the specific direction of the transmitted laser beam; the target signal mixer operatively connected to the at least one optical receiver and the high frequency chirp modulator; the target signal mixer comprising an operating system for mixing the detected laser beam reflected off of the scanned object with the at least one output signal of the high frequency chirp modulator for generating an intermediate frequency that is used for determining the distance of the scanned object from the optical tracking and ranging device; and
   a target location and range element operatively connected to the signal processor for storing the target location and range information;
   whereby the device can detect an object using a substantially conical, wide-angle scanning pattern, or can track and pin-point the object by operating in a very specific direction.

6. The system of claim 5 wherein the micro semiconductor laser transmitter is a frequency modulated continuous wave (FMCW) laser.

7. The system of claim 5 wherein the micro semiconductor laser transmitter is an integrated vertical-cavity surface-emitting laser.

8. The system of claim 5, wherein the at least one photo receiver comprises at least one metal-semiconductor-metal photo detector.

9. The system of claim 5 wherein the laser transmitter is a vertical cavity surface emitting laser and the photo receiver is a metal-semiconductor-metal photodetector mounted on the same submount as the vertical cavity surface emitting laser.

10. The system of claim 5 wherein the at least one photo sensor has an electrical bias modulated at the same time-dependent operational frequency as the transmitted optical signal.

11. The system of claim 5 wherein the laser transmitter transmits a highly collimated beam that is amplitude modulated with a chirped RF signal at frequency $f_{RF}$.

12. The system of claim 11, wherein the target signal mixer mixes the return light signals with a portion of a delayed transmitted waveform to generate an intermediate frequency $f_{IF}$ corresponding to the time delay due to the distance traveled by the return signal whereby the distance to the object can be determined from the following equation:

$$f_{IF} = \left(\frac{2D}{c}\right)\left(2\frac{\Delta f}{T}\right) = \frac{4D(\Delta f)}{cT}$$

$$D = \frac{cT}{4\Delta f} f_{IF}$$

where c is the speed of light, D is the distance from the sensor to the target, and $\Delta f$ is the chirping modulation over a time period of T.

* * * * *